March 22, 1960  J. D. EVERS ET AL  2,929,252
PIVOT AND SEALING MEANS
Filed Oct. 31, 1957

INVENTORS
JAMES D. EVERS
CHARLES F. STEARNS
BY Vernon F. Hauschild
ATTORNEY

United States Patent Office

2,929,252
Patented Mar. 22, 1960

2,929,252
PIVOT AND SEALING MEANS

James D. Evers, Thompsonville, Conn., and Charles F. Stearns, East Longmeadow, Mass., assignors to United Aircraft Corporation, East Hartford, Conn., a corporation of Delaware Application October 31, 1957, Serial No. 693,596

2 Claims. (Cl. 74—18.1)

This invention relates to pivot and sealing devices and, more particularly, to such devices which extend into separate chambers and seal therebetween.

It is an object of this invention to provide pivot and sealing means which seals betwen and extends into two separate chambers, which provides a straight line rolling type of pivotal contact between a pivot rod and the chamber defining structure and which further provides an O-seal coplanar with the straight line pivot contact.

It is a further object of this invention to provide pivot and sealing means which are capable of efficient operation while transmitting, by way of its pivotal action, substantial loads between a force transmitting means at one of its ends and a force receiving means at its other end, and which are further capable of efficient operation, by way of pivotal action and sealing, when different fluids and/or fluids at vastly different pressures are present in the two chambers.

It is a further object of this invention to provide pivot and sealing means between two chambers and to prevent all other relative movement, except the aforementioned pivotal movement, between the pivot means and the chamber defining structure and to transfer all loads imposed upon the pivot means as a result of attempted relative motion to the chamber defining structure.

It is still a further object of this invention to teach pivot and sealing means in which there is minimal friction resistance moment.

These and other objects of this invention will be evident or will be pointed out in the following description of an embodiment of this invention shown in the accompanying drawings, which are:

This invention will be described with respect to a portion of the fuel control system of a modern turbojet engine but it should be borne in mind that it is equally useable in innumerable other applications requiring sealing and pivoting against high pressure differentials, different fluids and high load transmission. A complete description of a fuel control system for a modern turbojet engine is contained in United States Patent Numbers 2,759,549, 2,782,767, and 2,782,769.

Figure 1:
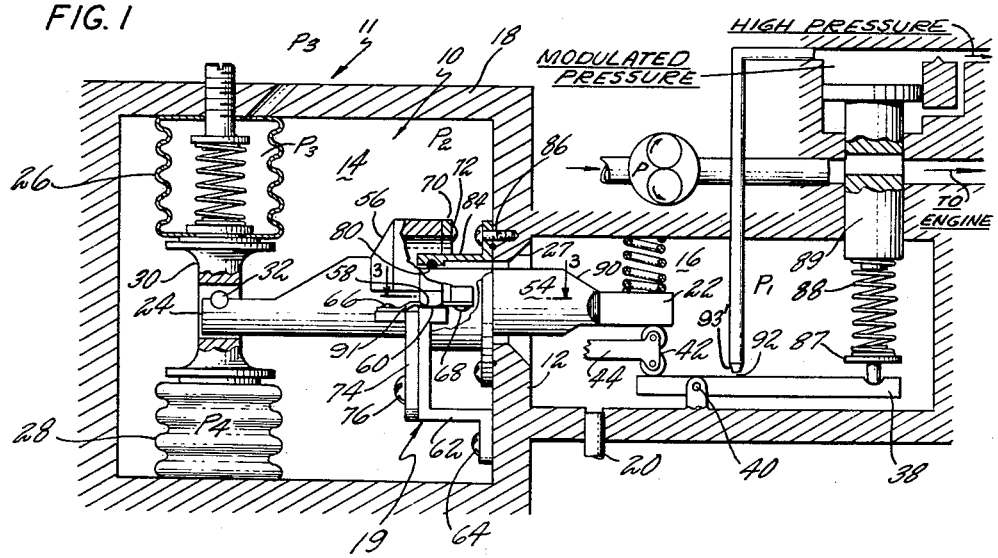
Fig. 1 is a schematic representation of a portion of a control system of the type used in modern aircraft turbojet engines showing our pivot and sealing means in one of its potential environments, with the pivot and sealing means partially broken away for purposes of illustration.

Referring to Fig. 1, we see pivot and sealing means 10 shown as part of turbojet engine fuel control and passing through wall 12 and extending into chambers 14 and 16. Wall 12, and chambers 14 and 16, are defined by chamber defining means or structure 18, which may be any well known chamber defining device such as a series of connected walls. Chamber defining structure 18, together with members 62 and 74 (to be described hereinafter) constitute stationary unit 19. Chambers 14 and 16 may be subjected to fluids of a different type; for instance, chamber 14 may contain a gaseous fluid, such as air, while chambers 16 may contain a liquid type fluid, such as fuel or oil. The fluid in chamber 16 enters through line 20 and may be at any desired pressure, such as $P_1$. The fluid within chamber 14, which may be either pressurized or evacuating, will be defined as pressure $P_2$ and may be substantially different from pressure $P_1$, so that a substantial pressure differential exists between chambers 14 and 16. This substantial pressure differential will tend to move pivoting and sealing means 10 in translation from one of said chambers into the other of said chambers and provides an inter-chamber sealing requirement which our pivot and sealing means 10 fulfills.

A substantial pivot causing or pivot transmitting force is provided at either end 22 or 24 of pivot rod 90 of unit 10. For example, the pressure $P_3$ acting in conjunction with pressure $P_4$ on bellows units 26 and 28 respectively, which coact on bellows connecting rod 30, will cause end 24, which may be pivotally attached to rod 30 by pivot pin 32, to move upwardly or downwardly. It may be found desirable to connect rod 90 to rod 30 by pivot pin 32 if vibration problems are encountered in bellows 26 and 28 and such will not disturb the straight line rolling contact between surfaces 58 and 60 for the translation restraining means 91 and 93 will cause the highly flexible bellows 26 and 28 to move laterally with the end 24 of pivot rod 90. This movement of rod end 24 causes rod end 22, which may contact roller 42, to move in the opposite direction against the urgings of pivotal member 38, which pivots about pivot point 40. Rollers 42 are positioned by member 44 as a function of engine speed or speed and temperature. Pivotal member 38 is loaded by the force of spring 88 through spring seat 87, which is caused to move in response to movement of piston 89, which may be actuated as a function of engine speed, compressor discharge pressure, or one of the engine temperatures. Roller's 42 position varies the force felt by either lever 90 or 38.

It will be noted that any unbalance of forces will cause lever 38 to pivot in one direction or the other. The movement of lever 38 will cause valve 92, formed between nozzle 93' and pivotal member 38, to open or close, thereby causing the modulated pressure to increase or decrease corresponding to the particular movement. For example, when valve 92 opens due to unbalance of forces, then the modulated pressure decreases allowing piston 89 to move in a direction that would decrease the compression on spring 88, thereby reducing the force on and felt by lever 38. This reduction in force from spring 88 will cause lever 38 to move in the direction which would cause valve 92 to close until an equilibrium condition is established. The position of piston 89 is a function of the balance of forces in the system and therefore a function of engine parameter such as compressor discharge pressure, speed, and temperature.

It will be apparent that due to the urging of the pressure created forces on end 24 and the further urging of forces such as engine parameter forces on end 22, our pivot and seal unit 10 must be able to withstand substantial force transmitting and force receiving pivot loads, and transmit these loads accurately and without friction interference. This load transmission must be done without causing movement, other than pivotal movement of unit 10, if the sealing function is to be properly performed and if the load transmitting function is to be accurately carried out, otherwise the minimum friction moment, to be described hereinafter, would be destroyed.

It is an important aspect of our invention to teach withstanding high load transmission and high pressure differential sealing with a minimum of disturbance to the seal and pivot function. This is accomplished by establishing a straight line rolling contact pivot between the pivot unit 10 and the stationary unit 19 and utilizing sealing means coplanar therewith.

Considering our pivot and sealing unit 10 per se, we see that it comprises rod 90, which extends through aperture 27 of wall 12 and into chambers 14 and 16 and which is shown to be substantially circular in cross section at its central portion 54. Member 56 may be substantially semicircular in cross section and is attached to rod 90 and projects on each side thereof to present aligned pivot surfaces on each side of rod 90, one of which is shown at 58, and it should be borne in mind that there is a similar aligned surface (not shown) on the opposite side of rod 90. These two aligned surfaces, such as 58, are curved in a convex fashion to provide a rolling type of contact with cooperating aligned flat surfaces, such as 60 of stationary unit 19, which also exists on both sides of rod 90 and both flat surfaces align and cooperate with corresponding curved surfaces such as 58 to provide a straight line rolling type pivot contact between rod 90 and stationary unit 19. Surfaces 60 may be a part of wall 12 or may be attached thereto by member 62 and by means of bolts 64. Obviously, the shapes of surfaces 58 and 60 could be reversed. It will be apparent that a straight line rolling type pivot contact presents a minimum friction resistance moment opposing the pivot action.

A straight line contact between surfaces 58 and 60, taken in conjunction with other related parts to be described hereinafter, prevent relative rotation between pivot rod 90 and stationary unit 19.

Positioning strips, such as 91, are attached by rivets 68 to member 56 or member 70, which is attached thereto by connecting means 72 and by rivet 66 to wall 12, member 62, or member 74, which is attached to member 62 by connecting means 76. Positioning strips 91 are located on each side of pivot rod 90 and serve the function of preventing and restraining relative motion in translation between pivot rod 90 and stationary unit 19 and of transferring any pivot rod loading caused by attempted translation to stationary unit 19.

Figure 3:
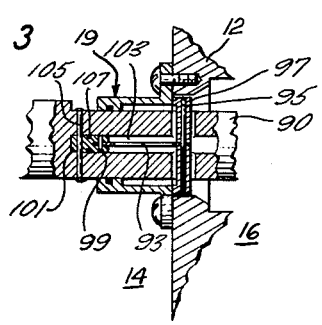
Fig. 3 is a cross-sectional view through line 3—3 of our Fig. 1 pivot and sealing means to illustrate an alternate translation restraining means.
Figure 2:
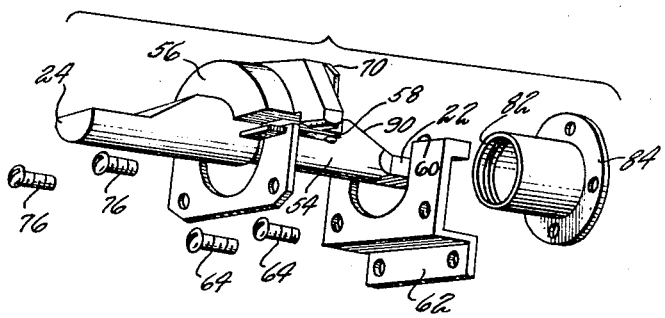
Fig. 2 is an exploded perspective showing of our pivot and sealing means.

If restraint of relative motion in translation between pivot rod 90 and stationary unit 19 is desired in both directions, strip 93 (see Fig. 3) may be used in conjunction with the two strips 91. Strip 93 attaches to rivet 95, which attaches to member 84 thru member 97, and to pin 99 which is retained in plug 101 within cavity 103. Rivet 105 positions plug 101 and seal 107 prevents leakage between chambers 14 and 16.

Resilient O-seal ring 80, which is preferably of substantial circular cross section, encompasses and contacts central section 54 of rod 90 and is received in inwardly directed annular recess 82 of member 84, which is attached to chamber defining member 18 by connecting means 86 so that sleeve member 84 serves to position seal ring 80 to be coplanar with the single line pivot contact existing between surfaces 58 and 60. This coplanar position insures minimum seal friction moment resistance to pivot action from seal 80.

In the manner just described, pivot rod 90 is caused to pivot about stationary unit 19 which includes members 62, 74, 84, and 18 in a single line rolling type pivot contact. O-seal ring 80 is positioned to be coplanar with the pivot contact line between pivot rod 90 and stationary unit 19, while restraining means 91 and 93 prevent relative motion by way of translation between pivot rod 90 and stationary member 19 while the action of the contacts between surfaces 58 and 60 prevent rotary motion of pivot rod 90 with respect to stationary means 19. Due to this single line rolling type pivot contact in combination with the coplanar seal ring, a virtually infinite pivot causing moment is obtained in view of the zero friction moment of the pivot point and the minimal seal resistance. In view of this, substantial pivot causing loads may be transferred thru the pivot action of pivot rod 90 in response to the force generating action of bellows members 26 and 28 and parameter members 44 and 42. Further, due in part to the aforementioned relative motion restraint of rod 90, effective seal and pivot action is obtained despite a substantial interchamber pressure differential, even when the fluids are of different types.

It will be obvious to those skilled in the art that the position of the pivot contact and O-seal may be varied in position along the length of rod 90 by changing the dimensions of members 62 and 84, thereby providing any desired moment advantage.

While only one embodiment of this invention has been shown for purposes of illustration, it will be evident that various changes in the construction and arrangement of the parts may be resorted to without deviating from the scope of the invention.

We claim:
1. A pivot arrangement comprising means defining two separate chambers with a wall member separating said chambers, a pivotable rod passing through said wall member, means providing a straight line pivot rolling contact between said rod and said defining means, a resilient ring seal of substantially circular cross-section coplanar with said line and contacting said rod and said defining means to seal therebetween, means to restrain all relative motion between said rod and said defining means except pivotal motion about said pivot contact solely, and force transmitting and receiving means attached to each end of said rod.

2. A pivot arrangement comprising stationary means defining two chambers adapted to contain different fluids and fluids at different pressures and having a wall member separating same, a pivotable rod passing through said wall member and extending into each of said chambers and being of substantially circular cross-section at its central section, first means attached to and extending on each side of said rod central section and providing aligned pivot surfaces, second means attached to said stationary means and providing aligned pivot surfaces on each side of said rod aligned with said first means pivot surfaces, said pivot surfaces of said first and second means shaped to present a curved-to-flat surface rolling contact thereby providing a straight line rolling pivot contact between said rod and said stationary means and preventing relative rotation between said rod and stationary means, a resilient ring seal of substantially circular cross-section encircling said rod central section, means to support said seal to be coplanar with said straight line pivot contact and to seal between said chambers, means supported by said stationary means to prevent relative motion in translation between said rod and said stationary means and to transmit the load caused by any attempted relative motion in translation between said rod and said stationary means to said stationary means, and force transmitting and receiving means pivotally attached to each end of said rod to cause said rod to pivot about said straight line pivot contact in response to the force differential therebetween.

References Cited in the file of this patent
UNITED STATES PATENTS

| | | |
|---|---|---|
| 1,702,056 | Murray | Feb. 12, 1929 |
| 1,878,440 | Duffy | Sept. 20, 1932 |
| 2,385,510 | Harwood | Sept. 25, 1945 |
| 2,640,361 | Scray | June 2, 1953 |
| 2,652,200 | Field | Sept. 15, 1953 |
| 2,690,360 | Young | Sept. 28, 1954 |
| 2,717,792 | Pelley | Sept. 13, 1955 |
| 2,759,075 | Hults | Aug. 14, 1956 |
| 2,795,959 | Roeser | June 18, 1957 |